United States Patent [19]
Federspiel

[11] 3,815,687
[45] June 11, 1974

[54] HITCH ASSEMBLY
[75] Inventor: Joseph A. Federspiel, Port Washington, Wis.
[73] Assignee: FMC Corporation, San Jose, Calif.
[22] Filed: Nov. 6, 1972
[21] Appl. No.: 303,890

[52] U.S. Cl............. 172/801, 172/272, 37/42 R, 280/508, 292/304
[51] Int. Cl....... E02f 3/76, A01b 51/00, B60d 3/00
[58] Field of Search.............. 172/272, 275, 801; 37/42 R; 16/146, 171, 172; 280/150 F, 460, 496, 504, 508, 509, 514; 292/216, 304, DIG. 49

[56] References Cited
UNITED STATES PATENTS
| | | | |
|---|---|---|---|
| 1,254,984 | 1/1918 | Christianson | 280/504 |
| 1,522,378 | 1/1925 | McLeod et al. | 172/801 |
| 3,548,956 | 12/1970 | Hochstetler | 172/801 |

FOREIGN PATENTS OR APPLICATIONS
| | | | |
|---|---|---|---|
| 629,873 | 12/1947 | Great Britain | 280/504 |
| 795,091 | 5/1958 | Great Britain | 172/272 |
| 632,969 | 1/1928 | France | 280/508 |

Primary Examiner—Robert E. Pulfrey
Assistant Examiner—Paul T. Sewell
Attorney, Agent, or Firm—A. J. Moore; C. E. Tripp

[57] ABSTRACT

Presented is a tractor implement push arm hitch useful for connecting the push arms of a bulldozer blade, for instance, to the frame of a tractor. The hitch assembly is designed to automatically lock when the implement arms are raised into a predetermined position, and means are provided for effecting purposeful unlatching of the implement arms when it is desired to remove them from the assembly.

8 Claims, 16 Drawing Figures

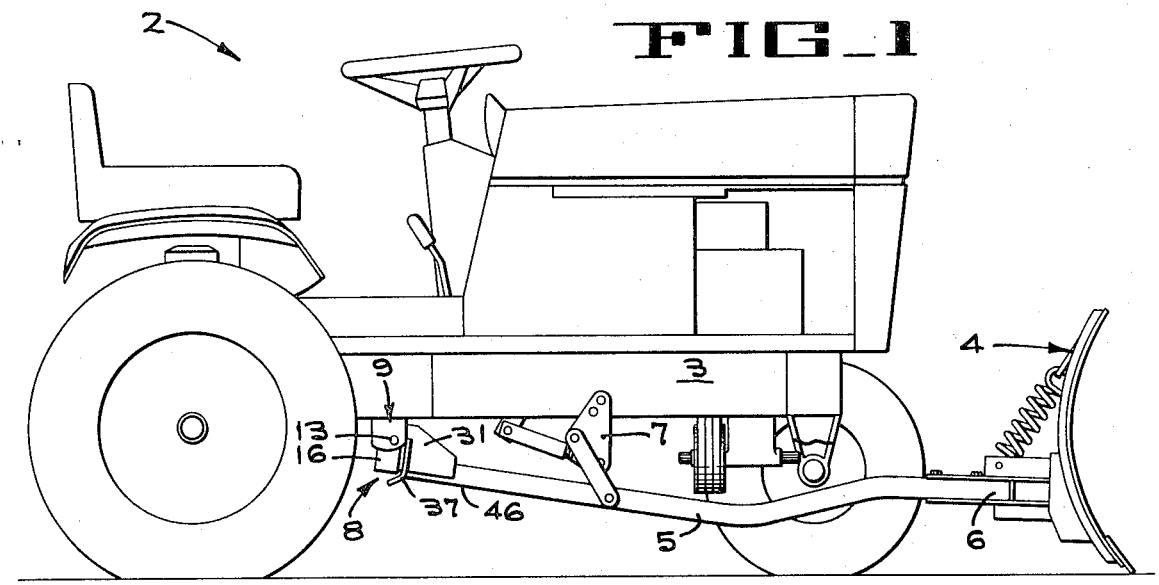
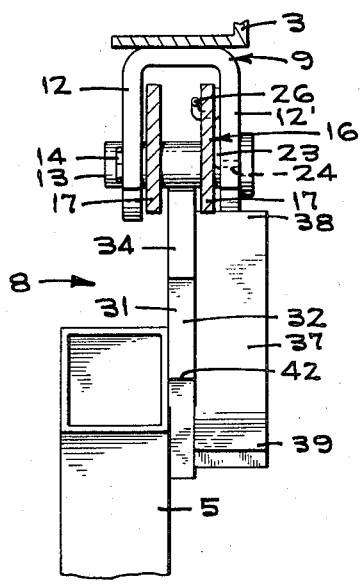
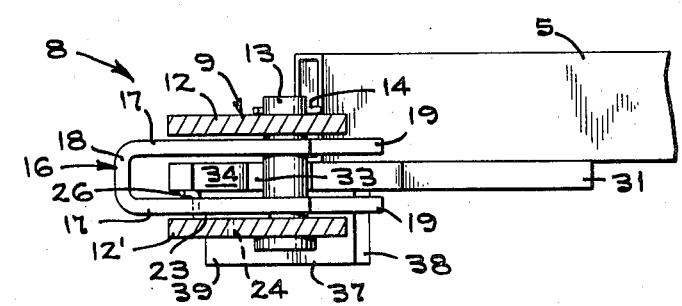

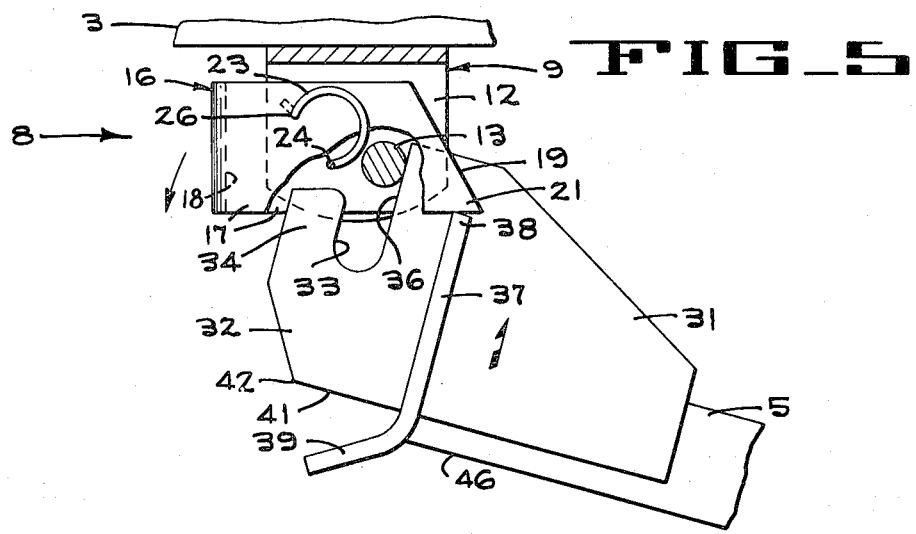
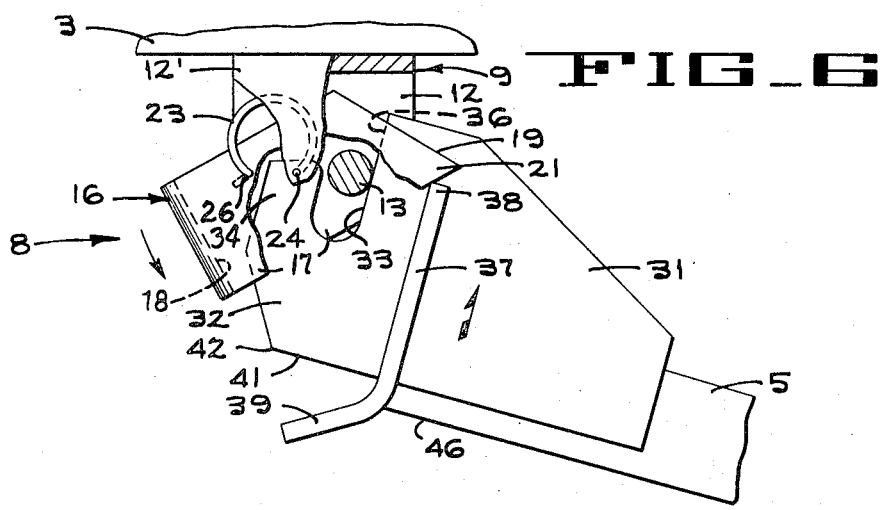
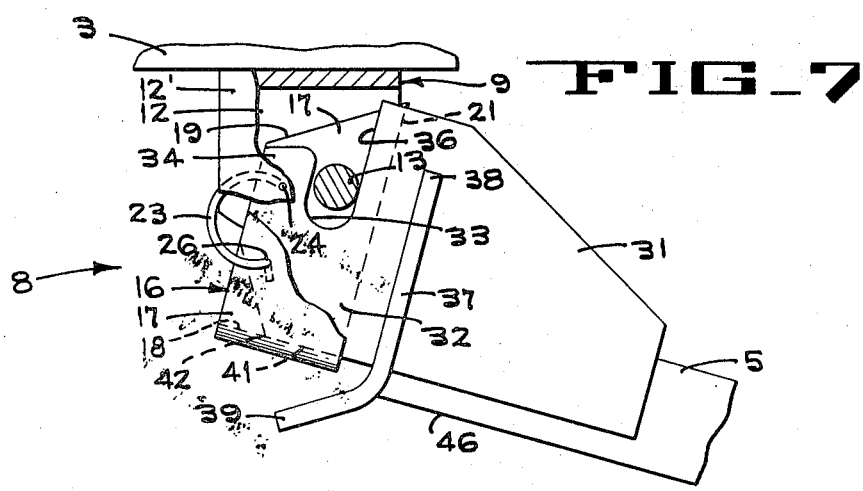

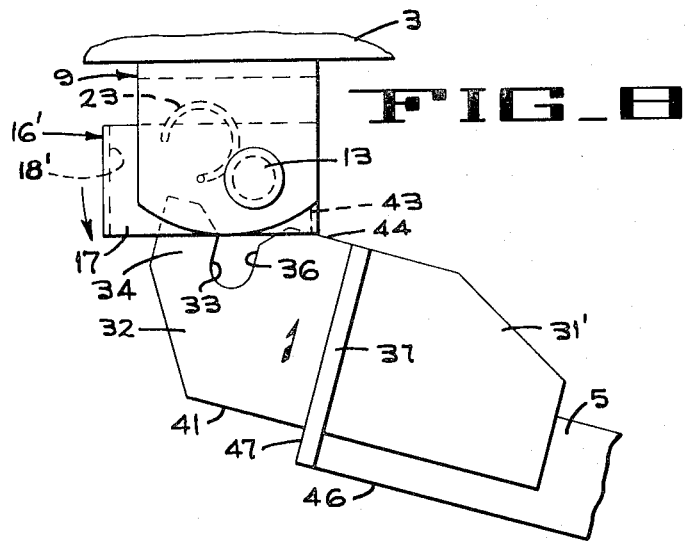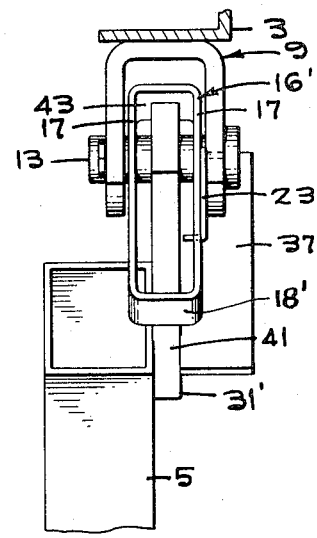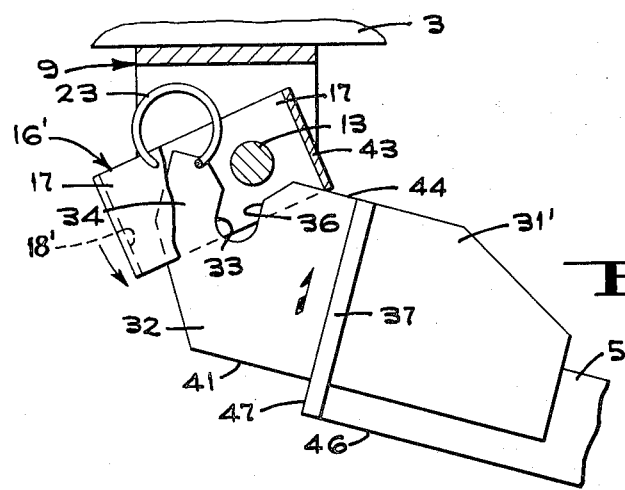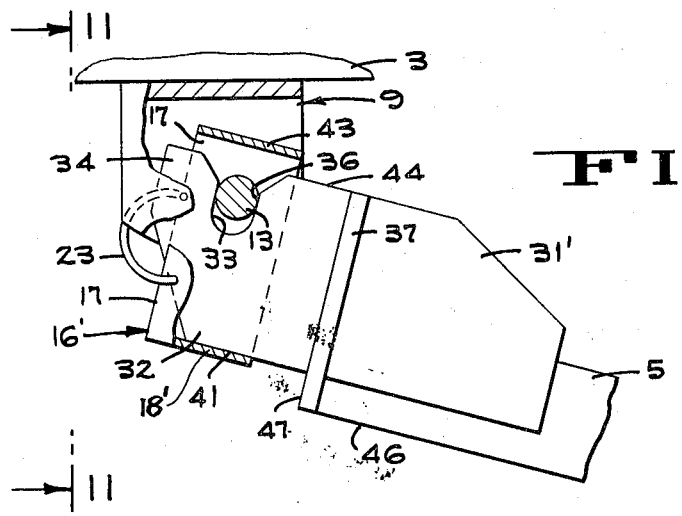

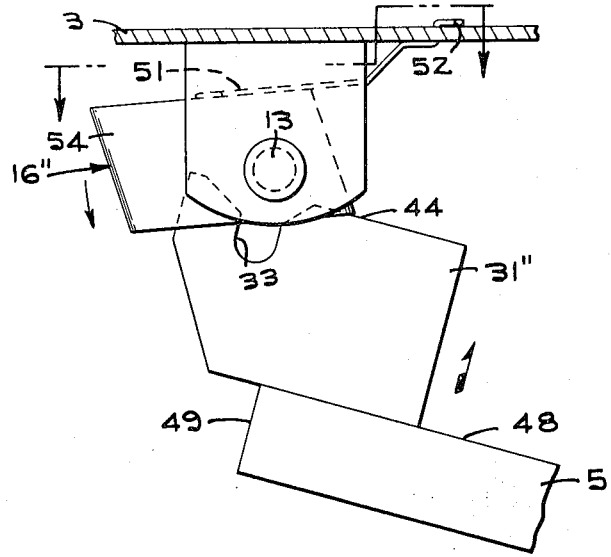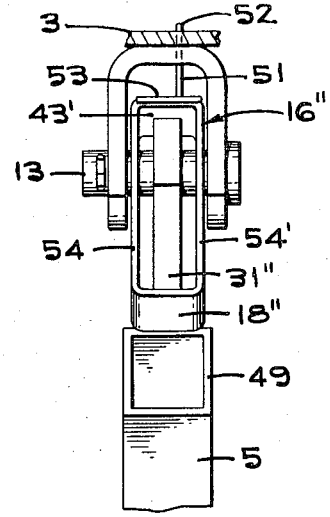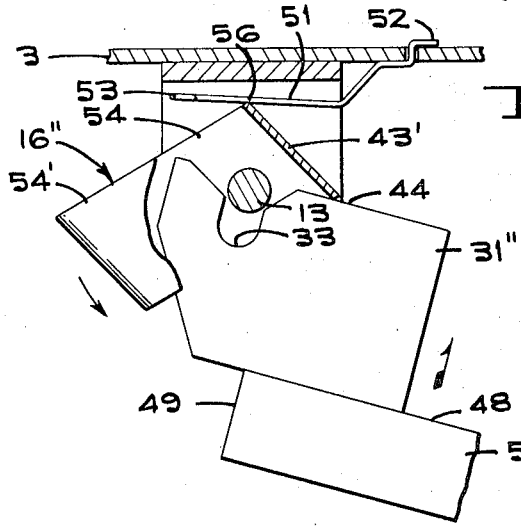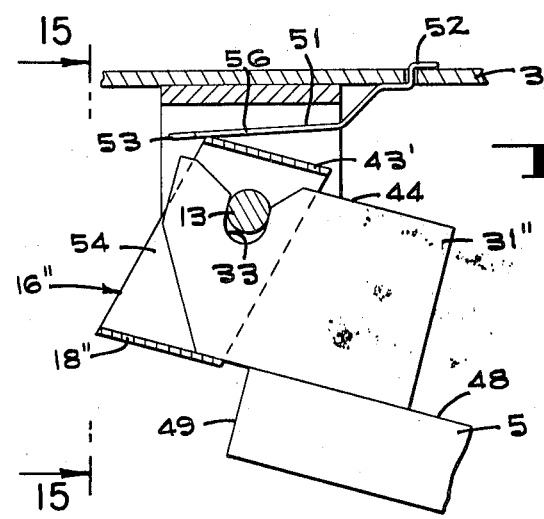

HITCH ASSEMBLY

BACKGROUND OF THE INVENTION

Tractor type vehicles are provided to which may be attached various implements for performance of various tasks. Many of these tasks require a relationship between the tractor and the implement such that the tractor pushes the implement. A push-blade for scraping and pushing snow and dirt is an example. Engagement between the implement and the tractor should be such that the implement is securely locked to the tractor in all attitudes of use, with the forces imposed during use being ineffective to unlock the implement from the tractor. Accordingy, it is one of the principal objects of the invention to provide a tractor implement push arm hitch assembly which when attached is blocked against inadvertent or accidental disengagement.

While implements of this nature tend to be relatively small, nevertheless they can be heavy, and it is desirable that attachment of the implement to the tractor be accomplished by a single person. Heretofore, various types of clamps, pins and split-spring rings have been utilized to effect this engagement, in most cases requiring the tedious alignment of holes, the insertion of pivot pins and the placement of split-spring rings or cotter pins to retain the pivot pins. These complicated and cumbersome hitch assemblies in most instances require two people, and if two people are not present, connection at least requires both hands of the operator, thus requiring the operator to lift the implement attachment arms into proper position, while at the same time, holding the implement arms in position to manipulate whatever split-spring rings or pins are required to effect the connection. Accordingly, it is another object of the invention to provide a tractor implement push arm hitch assembly which incorporates a latch mechanism which automatically locks the push arm in position by the mere act of proper placement of the connection end of the push arm.

Earthworking equipment such as small tractors embodying a pusher or a bulldozer blade frequently encounter boulders, rocks and brush which tend to unlock conventional hitches, or which get jammed in the mechanism so that it becomes extremely difficult to effect disengagement of the push arms from the tractor. Accordingly, it is a still further object of this invention to provide a push arm hitch assembly for a tractor implement which embodies a latch mechanism which is not susceptible to being inadvertently opened or jammed by foreign objects.

Many conventional hitch assemblies used for powered equipment require tools of one kind or another to effect engagment or disengagement. Accordingly, it is still another object of this invention to provide a tractor implement push arm hitch assembly which eliminates the need for tools of any kind for either attachment or detachment of the push arm hitch.

The invention possesses other objects and features of advantage, some of which with the foregoing, will be apparent from the following description and the drawings. It is to be understood however that the invention is not limited to the embodiments illustrated and described, since it may be embodied in various forms within the scope of the appended claims.

BRIEF SUMMARY OF THE INVENTION

In terms of broad inclusion, the implement push arm hitch assembly of the invention is utilized in conjunction with a tractor having a main frame on which are mounted a pair of support brackets adapted to be engaged to the associated ends of a pair of spaced implement arms connected at their other ends to the implement, for instance, a pusher blade. Each support bracket is conveniently formed to provide a pivot pin which functions also as an abutment portion through which push forces are transmitted to the implement. Pivotally mounted on each support bracket is a latch means resiliently biased into either a latched or unlatched position. Each latch means is provided with an abutment surface adapted to cooperate with the associated end of the implement arm so that when the implement arm is lifted into a predetermined position, the latch means automatically pivots into a locked position in which the latch means straddles a portion of the implement arm to form a saddle within which the end of the implement arm lies supported. Means are provided associated with the implement arm and latch means to prevent foreign objects such as brush and boulders from unlocking the latch means during use, while permitting intentional unlocking of the latch means by the operator.

BRIEF DESCRIPTION OF THE DRAWINGS

FIG. 1 is a side elevational view of a tractor having mounted thereon an implement in the form of a pusher blade connected to the tractor through spaced push arms utilizing the hitch assembly of the invention.

FIG. 2 is a fragmentary elevational view showing the hitch assembly in unlatched condition with the implement arm shown about to be attached.

FIG. 3 is a horizontal cross-sectional view taken in the plane indicated by the line 3—3 in FIG. 2.

FIG. 4 is a vertical cross-sectional end view taken in the plane indicated by the line 4—4 in FIG. 2.

FIG. 5 is a view similar to FIG. 2 with portions of the support bracket and latch means broken away to reveal the underlying structure and cooperative relationship of the parts.

FIG. 6 is a view similar to FIG. 2 with portions of the support bracket and latch means broken away, and the associated implement arm moved into a position of partial engagement.

FIG. 7 is a fragmentary elevational view partly in section and broken away to illustrate the relationship of the parts after full engagement of the implement arm with the support bracket and latch means.

FIG. 8 is a fragmentary elevational view of a second embodiment of the hitch assembly, the parts being shown in their respective positions just prior to engagement of the implement arm.

FIG. 9 is a fragmentary elevational view partly in section with portions of the latch means broken away to disclose the underlying structure, and with the implement arm moved into partial engagement.

FIG. 10 is a fragmentary elevational view partly in section of the hitch assembly of FIGS. 8 and 9 in full engagement. Portions of the structure are broken away to reveal the underlying structure.

FIG. 11 is a fragmentary elevational end view taken in the direction indicated by the arrows on line 11—11 in FIG. 10.

FIG. 12 is a fragmentary elevational view of a third embodiment of the invention, the parts being illustrated in their relationship just prior to engagement.

FIG. 13 is a fragmentary elevational view of the embodiment illustrated in FIG. 12, showing the parts in their relationship when the implement arm is partially engaged. Portions of the structure are broken away for clarity.

FIG. 14 is a fragmentary elevational view of the embodiment illustrated in FIG. 12 after full engagement of the implement arm.

FIG. 15 is a fragmentary elevational end view taken in the direction indicated by the arrows on line 15—15 in FIG. 14.

FIG. 16 is a fragmentary view taken in the direction of the arrows on line 16—16 in FIG. 12, and illustrating the relationship between the biasing means and the latch means of this embodiment.

DESCRIPTION OF THE PREFERRED EMBODIMENT

In terms of greater detail, the push arm hitch assembly of the invention is adapted for use in conjunction with a tractor, designated generally by the numeral 2 in FIG. 1, the tractor being provided with a frame 3. An implement designated generally by the numeral 4, and in the present instance constituting a pusher blade, is adapted for attachment to the main frame 3 of the tractor through a pair of spaced push arms 5, only one being shown, each connected at one end 6 to the implement, pivotally suspended intermediate their ends by linkage 7 to the tractor frame so as to permit vertical manipulation of the push arms to raise or lower the pusher blade, and connected at their free ends to the tractor frame through the push arm hitch assembly of the invention, designated generally by the numeral 8.

The preferred embodiment of the push arm hitch assembly is illustrated in FIGS. 1 through 7, while second and third embodiments of the push arm hitch assembly are illustrated in FIGS. 8 through 11 and 12 through 16, respectively.

Referring to the embodiment of the invention illustrated in FIGS. 1 through 7, it will be seen the frame member 3 provides a solid support base to the underside of which is secured a generally U-shaped depending support bracket designated generally by the numeral 9, having laterally opposed arms 12 and 12'. A pin 13 is slidably disposed in aligned holes formed in each arm and retained by a cotter pin 14.

The pin 13 pivotally supports U-shaped latch mechanism 16 constituting an essential part of the present invention. In the preferred embodiment of the invention the latching mechanism 16 comprises legs 17 which are appropriately apertured and journaled so as to pivotally rotate on the pivot pin 13. At one end, the legs 17 are integral with a cross member 18 (FIG. 3), while their other ends are formed with sloping or angular surfaces 19 providing clearance for rotation of the latch 16 within the support bracket on the pivot pin 13.

The latch 16 is resiliently biased into the position illustrated in FIG. 2 by a spring 23 having one end 24 suitably anchored in the leg 12' of the inverted U-shaped support bracket, while the opposite end 26 of the spring is suitably anchored in one leg 17 of the pivotal latch bracket member 16 (FIG. 4). The pivotal axis of the latch bracket, and the interposition of the spring 23 between the latch bracket and the support bracket is such that the latch bracket is resiliently biased into either the position illustrated in FIG. 2 or the position illustrated in FIG. 7. Referring to FIG. 2, it will be noted that in this position of the latch bracket the tendency of the spring 23 to expand will cause a rotary moment of force about the axis of the pivot pin 13, tending to rotate the latch bracket 16 clockwise as viewed in FIG. 2, which is the unlatching direction.

Referring to FIG. 7, when the latch bracket 16 has been pivoted counter-clockwise into the position there illustrated, the pivot axis of the latch bracket and the anchor points for the spring 23 are related so that expansion of the spring tends to rotate the latch bracket in a counter-clockwise direction, or the latching or locking direction.

In the preferred embodiment of the invention illustrated in FIGS. 1 through 7, each implement arm 5 is fabricated from hollow steel tube stock having, on the outside lateral surface thereof, an upwardly projecting plate 31 welded to the push arm 5 and extending axially beyond the push arm. The plate 31 includes an end portion 32 having a latch slot 33 defined on one side by an integral latch finger 34 and on the other side defined by an abutment surface 36. As illustrated in FIG. 2, the abutment surface 36 extends upwardly beyond the latch finger so that when the push arm is raised into the position illustrated in FIG. 2, the abutment surface may be abutted against the pin 13 in the space between the arms 17 of the latch bracket prior to engagement of the pivot pin in the latch slot 33. This facilitates engagement of the push arms as it merely requires placement of the abutment surface 36 against the pivot pin 13.

Welded to the near side of latch plate 31 is a deflector bracket 37 having an upper end portion 38 and a lower angularly disposed deflector portion 39 which extends below the push arm 5 as shown. Deflector bracket 37 performs two functions. In the position illustrated in FIG. 2, the upper end of the deflector bracket 37 engages the end portion 21 of one of the legs 17 of latch bracket 16, and as the push arms 5 are raised upwardly the latch bracket pivots counter-clockwise against the resiliently biased latch spring 23. Continued upward movement of the push arm as illustrated in FIG. 6 results in the latch bracket 16 being pivoted into the position there illustrated in which the axis of rotation of the latch bracket and the anchor points of the spring 23 are in general alignment. In this position of the parts, as illustrated in FIG. 6, it will be noted that the latch slot 33 has moved upwardly relative to the pivot pin 13, while the pin 13 contacts engaged to the abutment surface 36. Continued counter-clockwise rotation of the latch bracket is effected simultaneously by continued upward pressure by the deflector bracket against the abutment portion 21 of the latch bracket and by the resilient bias imposed by the spring 23.

Referring to FIG. 7, when the push arm has been raised into its final position it will be noted that the pivot pin 13 now lies wholly within the latch slot while the portion 18 of the latch bracket 16 has swung downwardly into position below the lower edge 41 of the latch plate 31. In this position of the parts, the latch spring exerts a biasing force on the latch bracket tending to rotate the latch bracket in a counter-clockwise direction, or stated in other words, in a locking or latching direction. It is at this point that a second function of the deflector bracket 37 becomes effective, in that the deflector bracket shields the latch bracket from any foreign objects that might otherwise tend to impinge thereagainst and impart a latch-opening force thereto.

It will thus be seen that in this embodiment of the invention all that is required is that the operator lift each push arm into the initial position illustrated in FIG. 2, and continue raising the push arm into the final position illustrated in FIG. 7. This can ordinarily be accomplished with one hand. All other operations of the latching procedure are effected automatically by the simple yet effective design of the latch assembly.

To unlock the latch bracket 16, the operator manually may grasp the connecting portion 18 of the U-shaped latch bracket, and rotates the latch bracket clockwise, as viewed in FIG. 7, until the connector portion 18 clears the corner 42 of latch plate 31. The parts are proportioned so that as the latch bracket clears the corner, the abutment portion 21 comes into contact with the upper end 38 of the deflector bracket 37, thus preventing continued clockwise rotation of the latch bracket 16 until the push arms 5 are depressed so as to permit rotation of the latch bracket into the position illustrated in FIG. 6. Once this position has been reached continued downward movement of the push arms will effect complete release of the push arm from the support bracket, and the spring 23 will effect repositioning of the latch bracket 16 so that it remains in proper position for repeating the latching procedure.

In the embodiment of the invention illustrated in FIGS. 8 through 11, identical parts of the first and second assembly have been identified by identical reference numbers and in the interest of brevity the description of these parts will not be reiterated. The same treatment is given identical parts in the embodiment illustrated in FIGS. 12 through 16. Elements of the assembly that are similar in construction and function to corresponding parts of the preferred embodiment, will be designated by the same reference numbers with the addition of primes.

Referring to FIGS. 8 and 10, it will be noted that the end of the implement arm 5 adapted to be detachably secured to the support bracket 9 is provided with a latch plate 31' which differs from the corresponding latch plate 31 in FIG. 2 in that the latch 31' is reduced in height. Thus, the finger 34 in this embodiment extends to the full height of the latch plate so that the latch slot 33 is substantially symmetrically formed in the latch portion 32 of the plate, the abutting surface 36 of the latch slot being only high enough to form its primary function of abutment against the pin 13. For purpose of guiding the latch slot into engagment with the pin 13, the slot is provided with chamfered edges where the slot is intercepted by the upper edge 44 of the latch plate.

The modified configuration of the latch plate in this embodiment also permits modification of the latch means 16'. As shown in FIGS. 8 through 10, the latch means takes the form of a tubular member by connecting the free ends of the arms 17 by a cross member 43. The other elements of the latch means remain substantially identical as before. It is noted however that in this embodiment, being suited to lighter construction, the deflector bracket 37 and the latch means 16' may be fabricated from lighter gauge material. Additionally, the cross member 43 of the latch means cooperates with the upper edge 44 of the latch bracket so that as the implement arm is lifted into engagement with the pin 13, the latch means 16' is caused to pivot counter-clockwise about the axis of the pivot pin (FIG. 9) until it reaches its completely locked position as illustrated in FIG. 10.

As with the embodiment illustrated in FIGS. 1 through 7, the latch spring 23 initially biases the latch means 16' in a clockwise direction to retain it in unlatched position prior to insertion of the implement arm. After insertion, as illustrated in FIG. 10, the latch spring biases the latch means 16' in a counter-clockwise or latching direction. In this position latch means 16' cradles the end of the implement arm to retain it in locked position. The deflector bracket 37 functions as before to deflect debris and boulders away from the latch bracket so that the latch cannot be opened inadvertently or accidentally.

To aid in this regard, it should be noted that in the embodiments of the invention illustrated in FIGS. 1-7 and 8-11, the latch plate is welded to the implement arm so that the lower edge 41 of the latch plate is spaced above the lower edge 46 of the implement arm. Thus, the rear edges of the implement arm 5 and the deflector bracket 37 cooperate to create a shoulder 47 which projects downwardly below the lower edge 41 of the latch plate so that all debris and boulders following the lower surface of the implement arms 5, will slip past the latch bracket 16' without impinging thereagainst.

It will be noted that in the embodiments illustrated in FIGS. 1-7 and 8-11, respectively, it is the function of the deflector bracket 37 to shield the latch means from being opened inadvertently by having dirt, clods, stones and debris jammed aginst it. Since the implement arms are moving forwardly with the tractor, debris and stones are deflected away from the bottom connector member of the latch bracket to prevent its being opened inadvertently. In the embodiment illustrated in FIGS. 12–16, the same problem exists, but it is met by a different means.

In this embodiment the latch bracket 16'' is modified to resemble a hollow parallelopiped having a connector portion 18'' at one end and a connector portion 43' at the opposite end. As with the other embodiments, a latch plate 31'' is provided with a latch slot 33 to receive the pivot pin 13, and the latch bracket 16'' is adapted to pivot counter-clockwise into the latching position illustrated in FIG. 14. Again, the function of the connector member 43' is to form an abutment against which the upper edge 44 of the latch plate 31'' may impinge to effect pivotal movement of the latch bracket counter-clockwise as the implement arm is inserted to locking position. In this embodiment the deflector bracket 37 (FIG. 2) is omitted entirely, and the latch plate 31'', instead of being welded to the side surface of the associated implement arm 5, is welded to the upper surface 48 thereof as shown so that the end 49 of the implement arm forms a shoulder which projects a considerable distance below the connecting member 18'' which retains the implement arm in locked position. Thus, as debris, boulders and stones pass beneath the implement arms, they are deflected away from the latch bracket by the implement arm itself.

One additional modification in this embodiment is that the nature of the latch spring which resiliently biases the latch bracket first in one direction and then in another direction has been modified in this embodiment. Referring to FIGS. 12-16, it will be seen that latch spring 51 is elongate and anchored at one end 52 in the associated frame member 3, while the opposite end 53 is formed to extend transversely across the long lateral edges 54 and 54' of the latch bracket, the configuration of the latch spring being such that in the position of the latch bracket illustrated in FIG. 12, the spring imposes a clockwise rotary moment on the latch bracket, tending to retain it in unlatched position as there shown.

As the implement arm is inserted (FIG. 13), counterclockwise rotation of the latch bracket under the impetus of the upper edge 44 of the latch plate causes the upper edge of the connecting wall 43' of the latch bracket to impinge against the intermediate section 56 of the spring arm, flexing it upwardly as viewed in FIG. 13, until the rotation of the latch bracket has carried it to the position illustrated in FIG. 13 in which the point of impingement of the spring arm on the upper corner of the latch bracket is substantially directly in line with the central axis of pin 13. From this point continued counter-clockwise rotation of the latch bracket is effected by two forces, namely, the upward movement of the latch plate and the resilience of the latch spring 51, which, as illustrated in FIG. 14, now presses downwardly on the upper left hand corner of the latch bracket so as to impose a resilient counter-clockwise rotary moment on the latch bracket about the pivot pin 13.

From the foregoing it will be seen that in each of the three embodiments, a positive latching action is provided merely by lifting the implement arms into a position in which the pivot-abutment pin 13 lies caught in the latch slot 33. There are no loose parts that are apt to get lost, thus rendering the hitch inoperable, nor is it necessary for the operator to use tools of any kind to either attach or detach the implement arms from the tractor. Because of the design, the latch mechanism is protected from interference from debris and boulders, and is not apt to get fouled by dirt and rust as is frequently the case with conventional hitches.

Although the best mode comtemplated for carrying out the present invention has been herein shown and described, it will be apparent that modification and variation may be made without departing from what is regarded to be the subject matter of the invention.

What is claimed is:

1. A hitch assembly adapted to facilitate the attachment and detachment of an implement, such as a bulldozer blade, to a tractor frame comprising: a support bracket mounted to the tractor frame, an implement arm, connecting means on said bracket for slidably receiving the end portion of said arm, latch means, means pivotally mounting said latch means on said support bracket, said latch means being movable between a latched position maintaining said implement arm engaged with said connecting means and an unlatched positon allowing the arm to move away from said connecting means, resilient means connected between said support bracket and said latch means for selectively maintaining said latch means in either said latched or unlatched position said implement arm including deflector means for pivoting said latch means from the unlatched to the latched position in response to movement of both the deflector means into engagement with the latch means and the implement arm into latched position.

2. The combination according to claim 1, in which said resilient means is a latch spring associated with said latch means to resiliently bias said latch means into unlatched position when said implement arm is detached from the support bracket and resiliently bias the latch means into latched position when the implement arm is engaged with said support bracket.

3. The combination according to claim 1, in which said support bracket comprises an inverted U-shaped memer having depending arms, and the connecting portion of said support bracket constitutes a pin extending between the free ends of said arms.

4. The combination according to claim 1, in which said support bracket includes an inverted U-shaped member, said connecting means being a pivot pin, and said latch means including a generally U-shaped portion pivotally connected to said member by said pivot pin with a portion of said implement arm being attached to said pin and disposed between both the U-shaped member and the U-shaped portion when in the latched position.

5. The combination according to claim 1, in which said latch means comprise a bracket having spaced arms, and means are provided on said implement arm adapted to abut at least one of said latch bracket arms to effect pivotal movement of the latch means into locking position when the implement arm is lifted into engagement with the support bracket.

6. A hitch assembly adapted to facilitate the attachment and detachment of an implement, such as a bulldozer blade, to a tractor frame comprising: a support bracket mounted to the tractor frame; an implement arm; means on said bracket for slidably receiving the end portion of said arm; latch means pivotally mounted on said support bracket; and means for selectively pivoting said latch means between latched and unlatched positions to enable attachment and detachment of said implement arm from said support bracket, said implement arm having a deflector for pivoting said latch means when the implement arm is moved into engagement with the support bracket; said latch means including a latch bracket having spaced apertured arms pivotally secured to said support bracket and connected at least at one end by a cross connector member cooperating with said arm to form a saddle within which the implement arm is seated when said latch means is pivoted to locked position by engagement of the implement arm with said support bracket.

7. A hitch assembly adapted to facilitate the attachment and detachment of an implement, such as a bulldozer blade, to a tractor frame comprising: a support bracket mounted to the tractor frame, an implement arm; means on said bracket for slidably receiving the end portion of said arm; latch means pivotally mounted on said support bracket; and means for selectively pivoting said latch means between latched and unlatched positions to enable attachment and detachment of said implement arm from said support bracket, said implement arm having a deflector for pivoting said latch means when the implement arm is moved into engagement with the support bracket; said support bracket including a generally U-shaped member having spaced arms; said latch including a generally tubular member one portion of the periphery of which provides a saddle within which said implement arm is seated when said latch member is pivoted into locking position, and another portion of the periphery of which constitutes an abutment against which the implement arm abuts to effect pivotal movement of the bracket when the implement arm is lifted into a locked position.

8. The combination according to claim 7, in which spring means are provided operable to bias the latch means to unlatched position when the implement arm is removed and operable to bias the latch means into latched position when the implement arm is engaged with said support bracket.

* * * * *